US008259957B2

(12) United States Patent
Frohlich et al.

(10) Patent No.: US 8,259,957 B2
(45) Date of Patent: Sep. 4, 2012

(54) COMMUNICATION DEVICES

(75) Inventors: David Frohlich, Elstead (GB); Lorna Brown, Cambridge (GB); Abigail Durrant, London (GB); Sian Lindley, Cambridge (GB); Gerard Oleksik, Bradwell (GB); Dominic Robson, London (GB); Francis Rumsey, Guildford (GB); Abigail Sellen, Cambridge (GB); John Williamson, Glasgow (GB)

(73) Assignee: Microsoft Corporation, Redmond, WA (US)

( * ) Notice: Subject to any disclaimer, the term of this patent is extended or adjusted under 35 U.S.C. 154(b) by 1274 days.

(21) Appl. No.: 11/972,283

(22) Filed: Jan. 10, 2008

(65) Prior Publication Data

US 2009/0180623 A1 Jul. 16, 2009

(51) Int. Cl.
*H04B 3/00* (2006.01)
(52) U.S. Cl. ........................................................ 381/77
(58) Field of Classification Search ..................... 381/77
See application file for complete search history.

(56) References Cited

U.S. PATENT DOCUMENTS 5,307,051 A 4/1994 Sedlmayr
6,150,947 A 11/2000 Shima
6,418,346 B1 * 7/2002 Nelson et al. ................... 607/59
7,126,467 B2 10/2006 Albert et al.
7,254,455 B2 8/2007 Moulios
7,577,262 B2 8/2009 Kanamori et al.
7,732,697 B1 6/2010 Wieder
2002/0067835 A1 6/2002 Vatter
2002/0111539 A1 * 8/2002 Cosentino et al. ............ 600/300
2003/0109298 A1 6/2003 Oishi et al.
2003/0160682 A1 8/2003 Yamada et al.
2003/0187924 A1 * 10/2003 Riddle .......................... 709/204
2004/0001079 A1 1/2004 Zhao et al.
2004/0153510 A1 * 8/2004 Riddle .......................... 709/205
2006/0075347 A1 4/2006 Rehm
2007/0013539 A1 1/2007 Choi et al.
2007/0133351 A1 6/2007 Taylor
2007/0172114 A1 7/2007 Baker et al.
2009/0146803 A1 6/2009 Sellen et al.

(Continued)

FOREIGN PATENT DOCUMENTS

EP 0298046 A2 1/1989

(Continued)

OTHER PUBLICATIONS

Bian, et al., "Using Sound Source Localization to Monitor and Infer Activities in the Home", pp. 1-16.

(Continued)

*Primary Examiner* — Thao Le
(74) *Attorney, Agent, or Firm* — Lee & Hayes, PLLC

(57) ABSTRACT

The disclosure relates to communication devices which monitor an audio environment at a remote location and convey to a user a representation of that audio environment. The "representation" may be an abstraction of the audio environment at the remote location or may be a measure of decibels or some other quality or parameter of the audio environment. In some embodiments, the communication devices are two-way devices which allow users at remote locations to share an audio environment. In some embodiments, the communication devices are one way devices. In some embodiments, the communication devices may have the form of a window and be arranged to present sound in a manner that mimics sound received through a window. In such embodiments, the more open the window is, the more sound is relayed by the communication device.

18 Claims, 11 Drawing Sheets

U.S. PATENT DOCUMENTS

| | | | |
|---|---|---|---|
| 2009/0147649 | A1 | 6/2009 | Brown et al. |
| 2009/0183074 | A1 | 7/2009 | Lindley et al. |

FOREIGN PATENT DOCUMENTS

| | | | |
|---|---|---|---|
| EP | 1755242 | A2 | 2/2007 |

OTHER PUBLICATIONS

Laydrus, et al., “Automated Sound Analysis System for Home Telemonitoring Using Shifted Delta Cepstral Features”, IEEE, 2007, pp. 135-138.

“Sonic Interventions”, at <<http://www.dwrc.surrey.ac.uk/ResearchProjects/CurrentProjects/SonicInterventions/tabid/105/Default.aspx>>, University of Surrey, Oct. 18, 2007, pp. 1.

Virone, et al., “First Steps in Data Fusion between a Multichannel Audio Acquisition and an Information System for Home Healthcare”, IEEE, 2003, pp. 1364-1367.

Final Office Action for U.S. Appl. No. 11/972,326, mailed on May 25, 2011, Sian Lindley, “Sound Display Devices,” 11 pages.

Non-Final Office Action for U.S. Appl. No. 11/952,820, mailed on Jun. 23, 2011, Lorna Brown, “Sound Playback and Editing Through Physical Interaction,” 8 pages.

* cited by examiner

COMMUNICATION DEVICES

BACKGROUND

Various methods and apparatus remote audio communication are known, for example telephones, intercoms, radio transmitter/receiver pairs and listening devices such as baby monitors. While such apparatus is particularly suited to exchanging detailed or specific information, there is no attempt to convey the audio environment at one location to another. This result in a feeling of remoteness between users as the audio environment forms a large part of the ambiance of a location.

Without any idea of the audio environment, it can be hard for a listener to understand the situation at the remote location and/or to empathize with a person at that location. For example, it can be hard for neighbors to empathize with one another over 'nuisance noise'. In other cases, a certain level and quality of noise can provide reassurance, for example, a carer listening in on young children need not be aware of the content of their conversation but will be reassured by an appropriate level of background noise.

The embodiments described below are not limited to implementations which solve any or all of the disadvantages of known communications devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The disclosure relates to communication devices which monitor an audio environment at a remote location and convey to a user a representation of that audio environment. The "representation" may be, for example, an abstraction of the audio environment at the remote location or may be a measure of decibels or some other quality or parameter of the audio environment. In some embodiments, the communication devices are two-way devices which allow users at remote locations to share an audio environment. In some embodiments, the communication devices are one way devices.

As used herein, the term 'abstraction' should be understood in its sense of generalization by limiting the information content of the audio environment, leaving only the level of information required for a particular circumstance.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in wireless communication system, the system described is provided as an example and not a limitation. As those skilled in the art will appreciate, the present examples are suitable for application in a variety of different types of communication systems.

Figure 1:
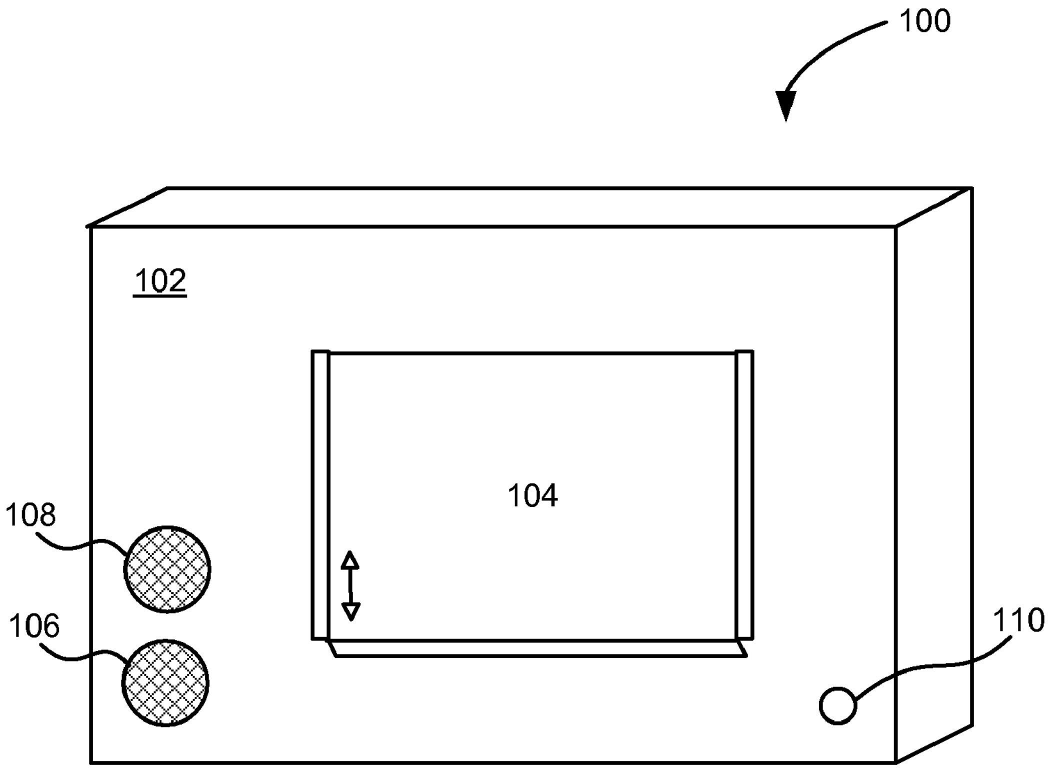
FIG. 1 shows a first example communication device.
Figure 2:
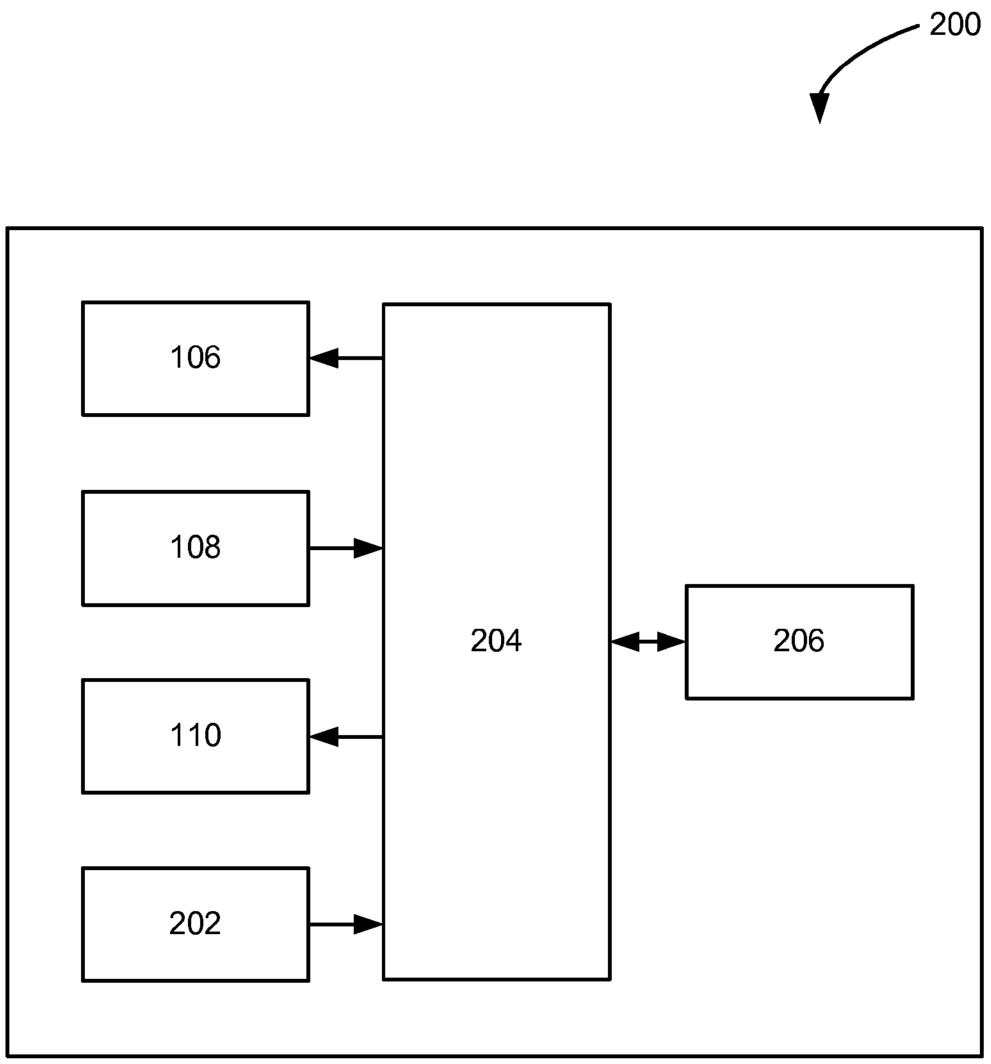
FIG. 2 shows detail of the processing circuitry of the device of FIG. 1.

FIG. 1 shows a communication device 100 for use in a two-way communication network. The device 100 comprises a housing 102 containing processing circuitry 200 as described in more detail in relation to FIG. 2, a movable portion, in this case a flap 104, a speaker 106, a microphone 108 and an indicator light 110. The flap 104 is mounted like a roller shutter and can be moved vertically up and down. In this example, the communication device 100 has the form factor of a window.

The processing circuitry 200 comprises a position sensor 202 which senses the position of the flap 104 and a microprocessor 204 which is arranged to receive inputs from the microphone 108 and the position sensor 202 and to control the speaker 106 and the indicator light 110. The processing circuitry 200 further comprises a transmitter/receiver 206 arranged to allow it to communicate with a local wireless network. The transmitter/receiver 206 provides inputs to the microprocessor 204 and is controlled thereby.

The position of the flap 104 acts as a selection means and controls qualities with which sound is transmitted and received by the device 100. If the flap 104 is fully closed (i.e. in its lowermost position), the microprocessor 204 detects this from the position sensor 202. The microprocessor 204 controls the microphone 108 and the speaker 106 such that no sound is transmitted or received by the communication device 100. If the flap 104 is in a middle position, the microprocessor 204 receives sound from the microphone 108 and (if, as is described further below, the device 100 is in communication with a second device 100) processes that sound using known algorithms to render it less clear or muffled. This processing results in an 'abstraction' of the audio environment as less information than is available is transmitted. Any sound received via the transmitter/receiver 106 will be played through the microphone 108, similarly muffled. If the flap 104 is fully open then sound is transmitted/received clearly, i.e. with no muffling. As the flap 104 is mounted as a roller blind, there are a large range of positions which it can occupy. The degree to which the sound is muffled, i.e. 'abstracted', is set by the position of the flap 104.

The indicator light 110 is arranged to indicate when the device 100 is in communication with another similar device 100. In the embodiment now described, this will be a paired device 100 arranged to communicate over a local wireless network. If the flap 104 on the second device 100 is in any position other than fully closed, the indicator light 110 on the first device 100 will be lit, and vice versa.

Figure 3:
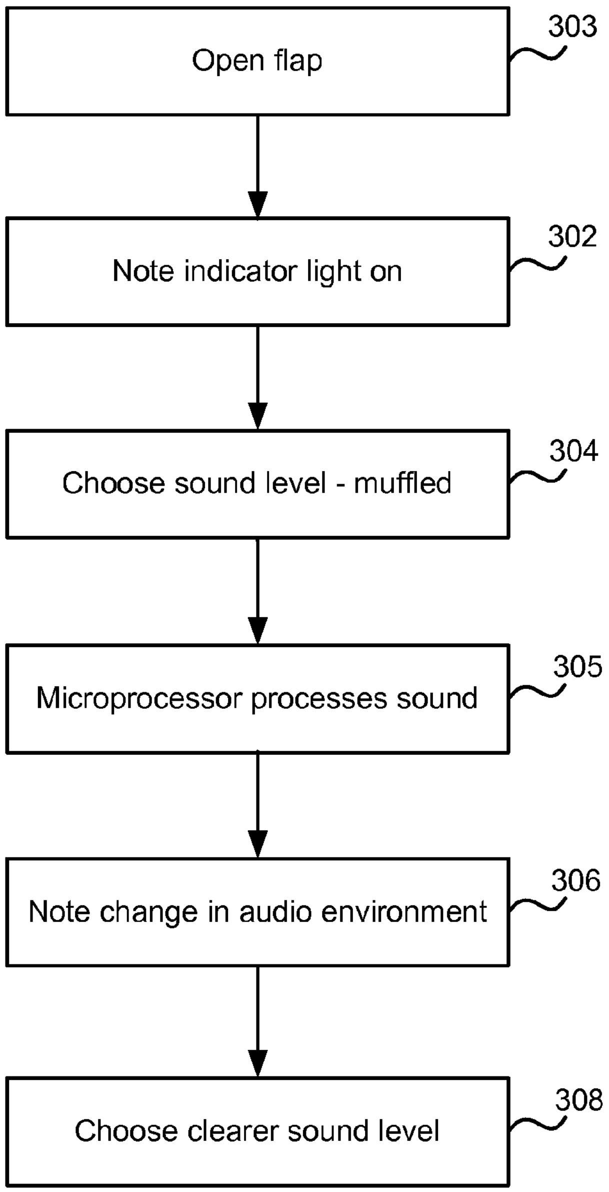
FIG. 3 shows a method of using the device of FIG. 1

A method of using the device 100 in conjunction with a second, similar device 100 is now described with reference to the flow chart of FIG. 3. In this embodiment, it is envisaged that the first and second devices 100 are arranged in a first and second area of a building, in this example, the study and the living area of a house. The second device 100, that in the living area, is a 'slave' to the first device 100 and will assume the same settings as that device 100.

In use of the paired devices 100, a user of the first device 100 wishes to listen in on the second device 100. The user of the first device 100 therefore opens the flap 104 (block 300) and the indicator light 110 on both devices is lit indicating that the second device 100 is capable of communicating sound (block 302). The user can choose the level of detail in the communication between the rooms (block 304). For example, the user may be working in the study, but wants to be reassured that his or her children are playing quietly in the living room. In such a case, the user may chose to have the flap 104 only partially open, i.e. in a mostly closed position. The sound from the living room received by the second device 100 under goes an abstraction process under the control of the microprocessor 204 of either device 100 and is presented to the user in a muffled form through the speaker 106 of the first device 100 (block 305). By looking at the device 100 in the living room the children will be able to see that the flap 104 is slightly open and that the indicator light 110 is on and will be aware that they can be heard. The user can continue with his or her work but can readily hear any dramatic changes in the sound levels from the living room, perhaps indicating that the children are arguing, have been injured or the like (block 306). In such an event, the user can opt to fully open the flap 104 on the first device 100 (block 308). This will result in sound being transmitted clearly (i.e. the sound data no longer undergoes an abstraction process) and will allow the user to obtain a clearer idea of what is occurring in the room and/or ask questions or communicate directly with the children. Of course, the user can choose to communicate clearly at any time.

Figure 4:
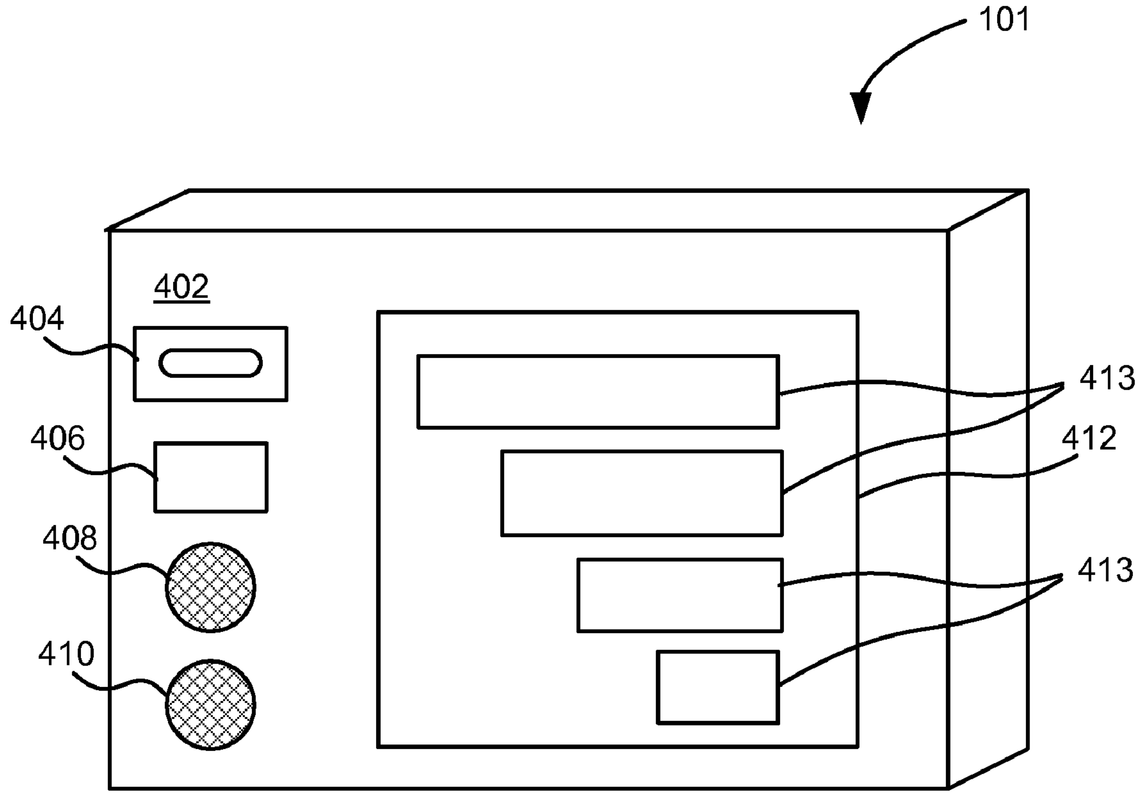
FIG. 4 shows a second example communication device.
Figure 5:
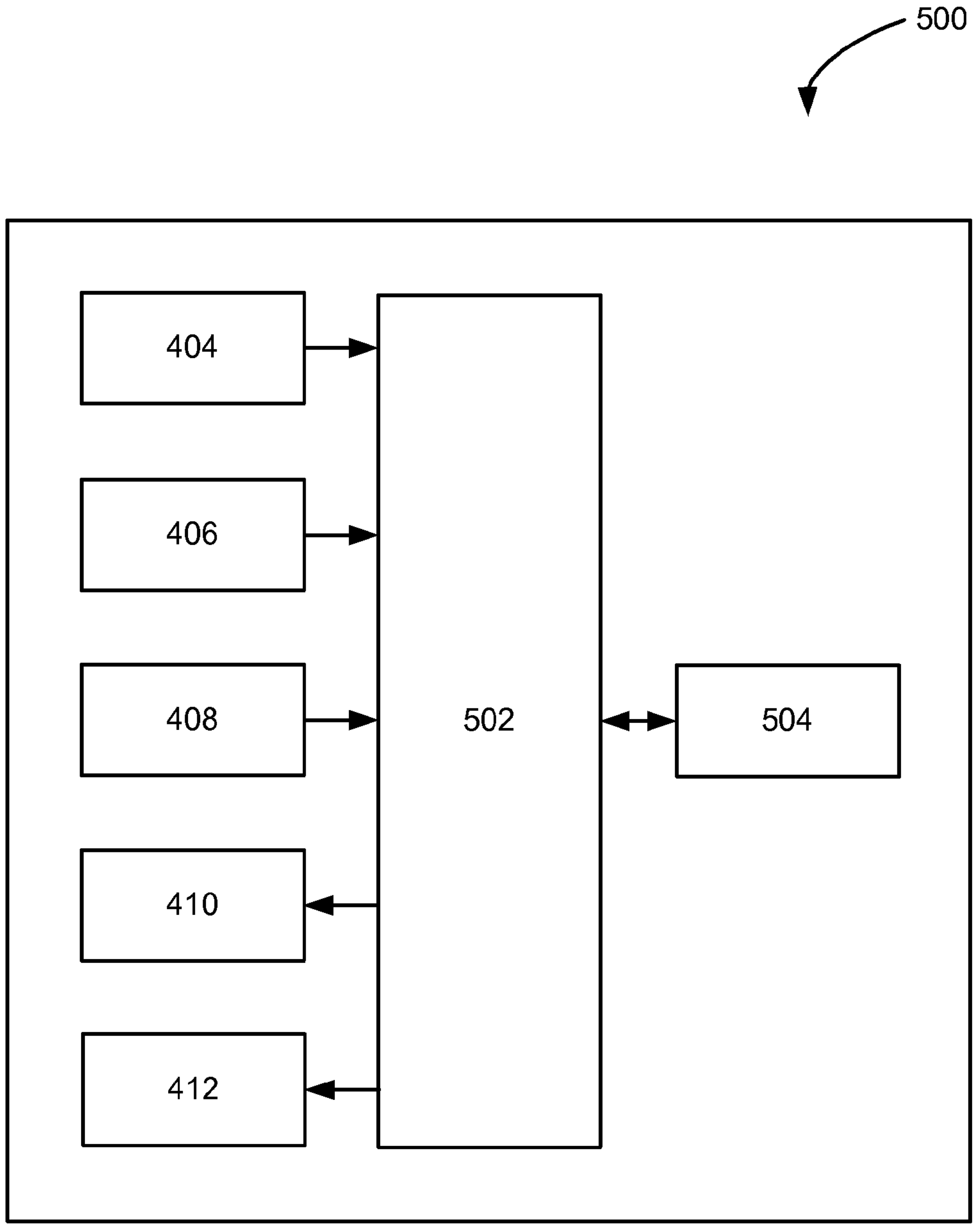
FIG. 5 shows detail of the processing circuitry of the device of FIG.4.

A second embodiment of a communication device 101 is now described with reference to FIG. 4. In this embodiment, the device 101 comprises a housing 402 with privacy selection means provided by a motion sensor 404 and a proximity sensor 406. The device 101 further comprises a microphone 408, a speaker 410, a display means in the form of level indicator 412 and internal processing circuitry 500 described below with reference to FIG. 5. The level indicator 412 comprises a series of bars 413 which are progressively lit, similar to those familiar from the field of mobile telephony to indicate signal strength. In this case, the level indicator 412 is arranged to show at what level (i.e. how clearly) sound is being transmitted from a paired device 101.

The processing circuitry 500 comprises a microprocessor 502 arranged to receive inputs from the motion sensor 404, the proximity sensor 406 and the microphone 408 and to control the level indicator 412 and the speaker 410. The processing circuitry 500 further comprises a transmitter/receiver 504 arranged to allow it to communicate with a local wireless network. The transmitter/receiver 504 provides inputs to the microprocessor 502 and is controlled thereby.

The motion sensor 404 is arranged to detect movement within the room or area in which the device 101 is being used. If motion is detected, the proximity sensor 406 determines how far from the device 101 the moving object is. The proximity is used to determine the level of abstraction with which sound is transmitted to another paired device. This in turn allows a user to determine their level of privacy by choosing how close to stand to the communication device 101. This level of abstraction is displayed on the level indicator 412 of a paired device 101. The closer a user is, the more bars 413 will be lit up. In this embodiment, neither of the paired devices 101 is a slave.

A user of a first device 101 selects how clearly audio data is transmitted from the first device 101 to paired device(s) 101 by his or her physical distance there from. The user of the first device is able to determine how clearly a user of a paired (second) device 101 is willing to transmit data from observing the level indicator 412. If the user of the first device 101 is also willing to communicate clearly, he or she can approach the first device 101 and communicate through the microphone 408. However, unless he or she opts to approach the device 101, only muffled abstracted, sound will be heard though the speaker 410. In this embodiment, the user of a first device 101 will be notified of the increased proximity of a user of a second device 101 with an audible alarm played through the speaker 410 when all the bars 413 are lit.

In some embodiments, the device 101 may not comprise proximity sensor 406, but may instead be arranged to set the volume/clarity based on how many people there are in the room. In order to achieve this, the device 101 could comprise a detector across a doorway arranged to detect when people enter or leave the room.

A further embodiment is now described in which communication devices are used to convey information about sound levels which can be heard remotely, for example tracking the sound levels that can be heard by a neighbor.

Figure 6:
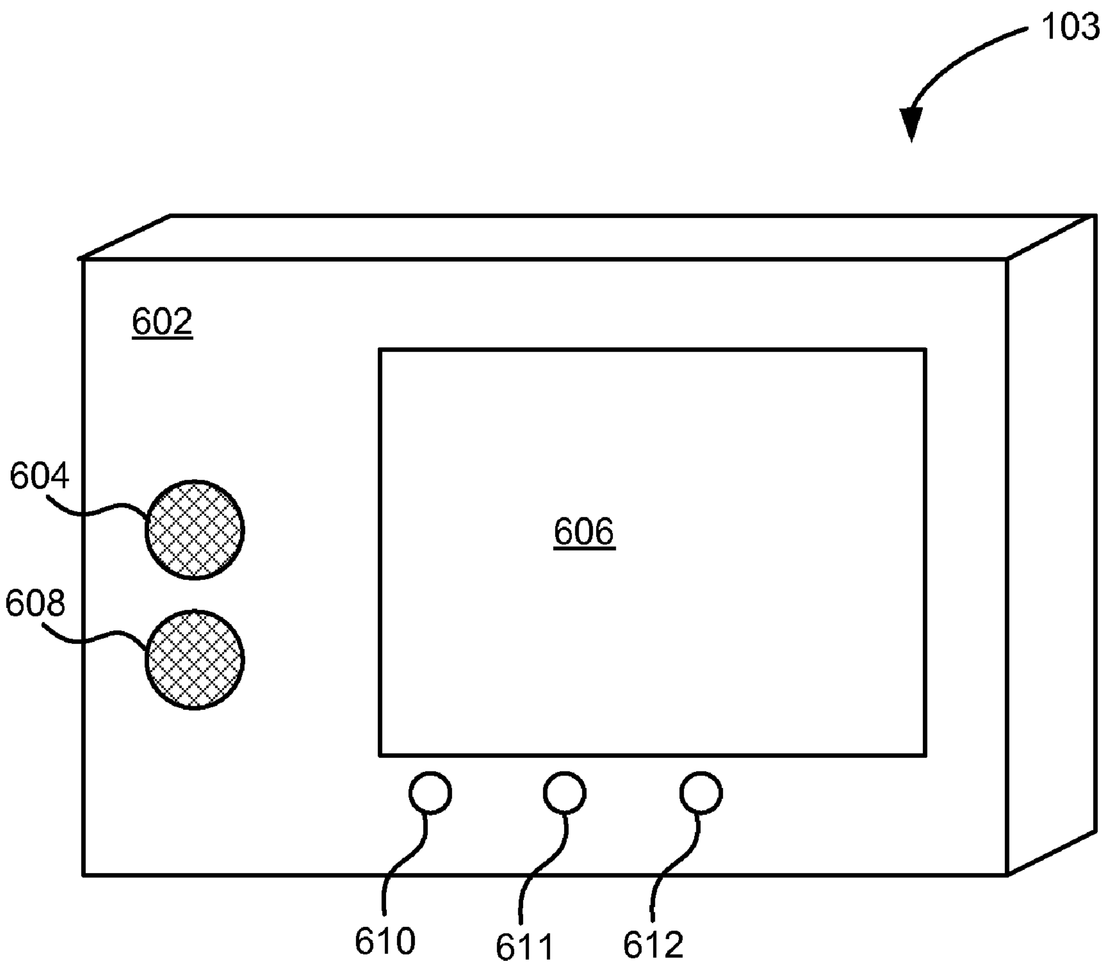
FIG. 6 shows a third example communication device.
Figure 7:
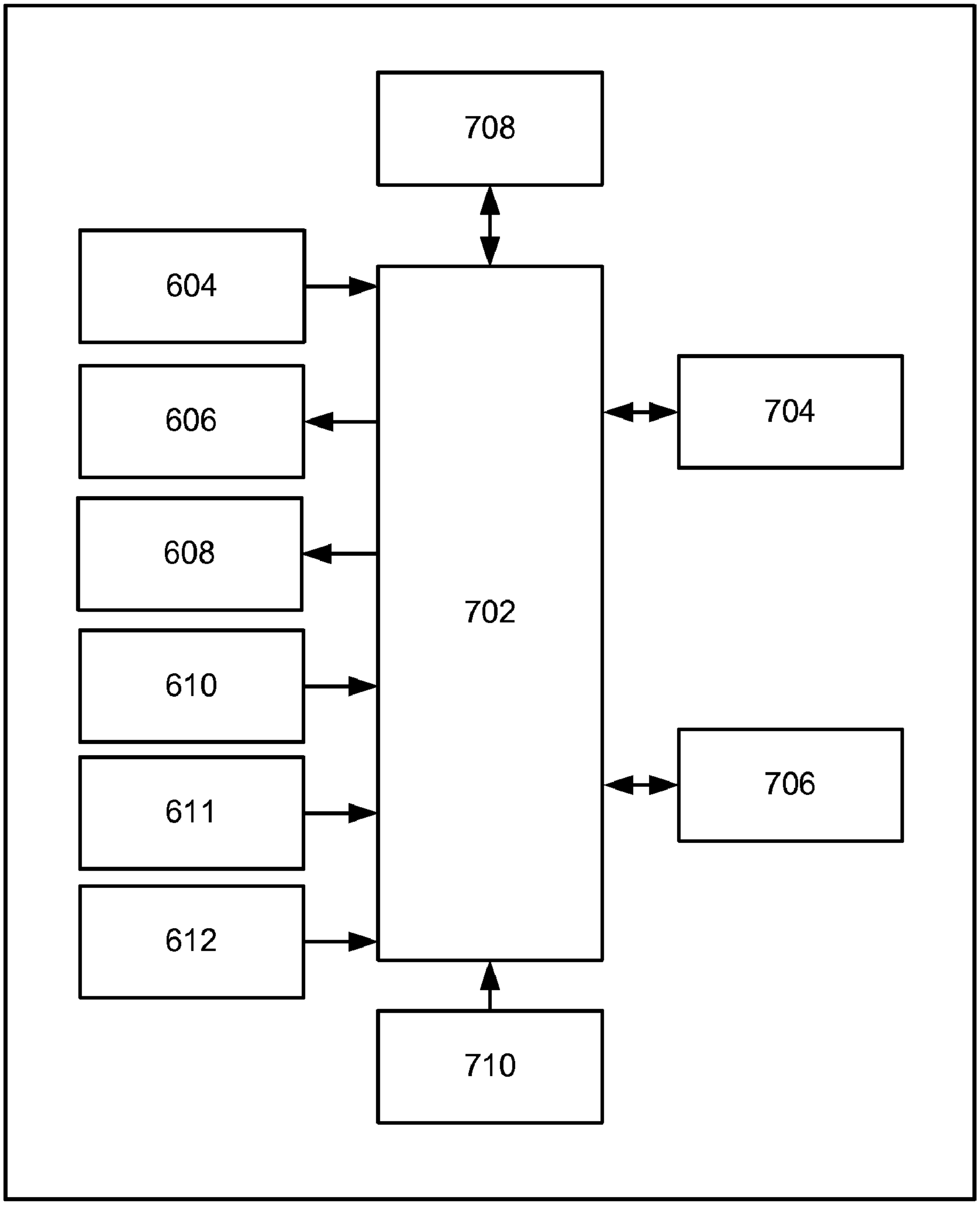
FIG. 7 shows detail of the processing circuitry of the device of FIG.6.

In this embodiment, communication devices 103 such as those shown in FIG. 6 are used. The device 103 comprises a housing 602 for a microphone 604, an LCD display panel 606, a speaker 608 and internal processing circuitry 700, which is further described with reference to FIG. 7. The device 103 also comprises three control buttons 610, 611, 612, specifically a set-up mode button 610, an auto-listener button 611 and a Display History button 612.

The processing circuitry 700 comprises a microprocessor 702, a memory 704, a transmitter/receiver 706, a sound analysis module 708 and a timer 710. The microprocessor 702 is arranged to receive inputs from the microphone 604 and the control buttons 610, 611, 612, and to control the speaker 608 and the LCD display panel 606, and can store data in and retrieve data from the memory 704. The transmitter/receiver 706 provides inputs to the microprocessor 702 and is controlled thereby.

In this embodiment, one of a pair of devices 103 is installed in each of two neighboring houses and are wall-mounted on either side of a party wall. The pair can communicate with one another wirelessly via their respective transmitter/receivers 706 to share data.

Figure 8:
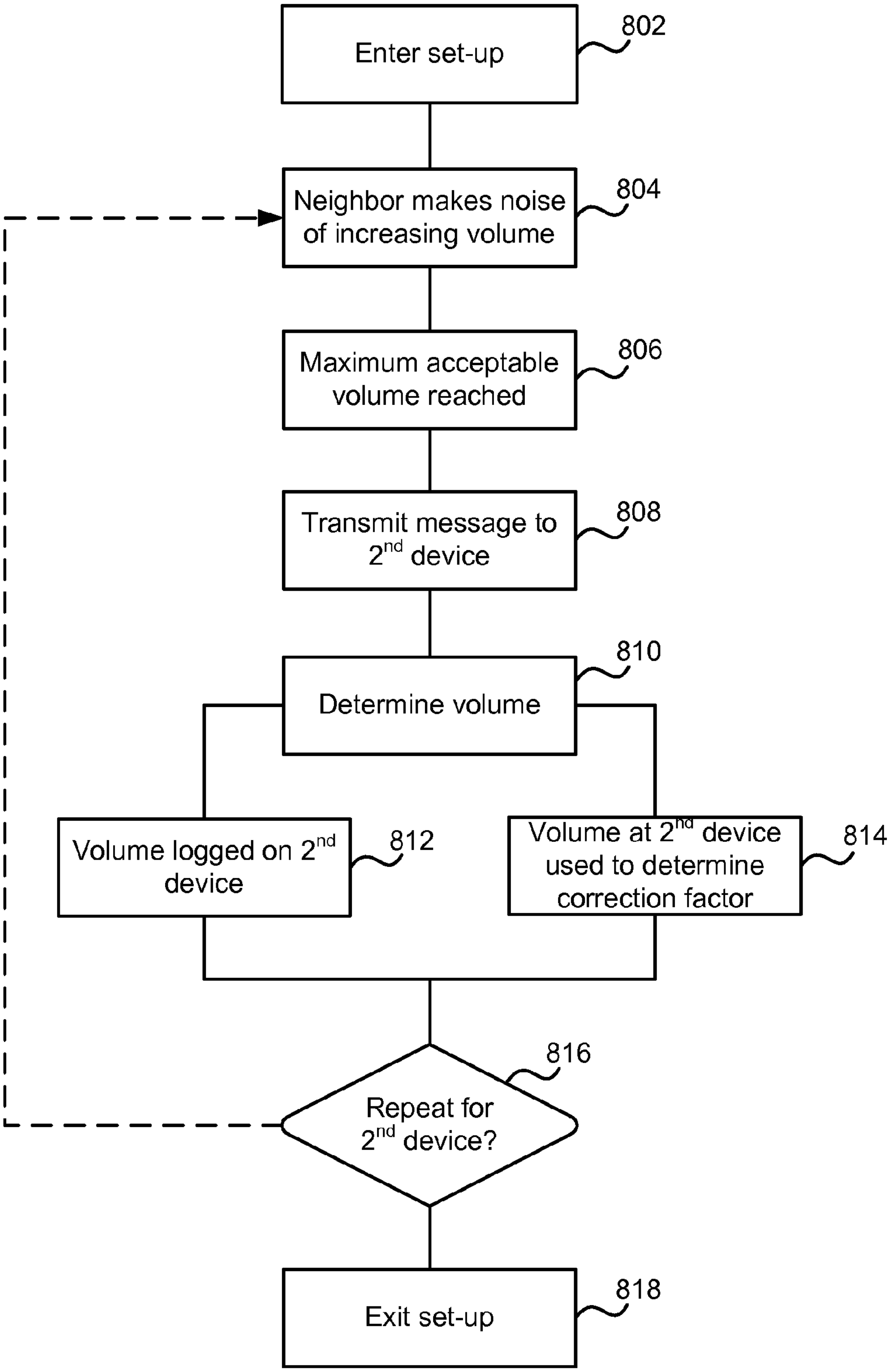
FIG. 8 shows a method of setting up the device of FIG. 6.

The process for setting up the pair of devices 103 is now described with reference to FIG. 8. The users of a pair of devices 103 enter the set-up mode by pressing the set-up mode button 610 (step 802). This causes the microprocessor 702 to control the LCD panel 606 to display a volume indicator. The neighbor of the user of the first device 103 (i.e. the user of the second device 103 of the pair) is then encouraged to make a noise of a gradually increasing volume, for example using a music player and turning up the volume in stages (step 804). The user of the first device 103 listens and when, in his or her opinion, a generally acceptable maximum volume has been reached, the user logs this volume by pressing the set-up mode button 610 again which provides an input to the microprocessor 702 (step 806). The microprocessor 702 of the first device 103 then causes its transmitter/receiver 706 to send a message to the second device 100 which includes both an instruction to log the volume and a measure of the volume in decibels (step 808). The microprocessor 702 of the second user device 103 uses the sound analysis module 708 to determine the volume of sound being received by the microphone 604 of that second user device 103 as a parameter in decibels (step 810). The maximum acceptable volume is then stored in the memory 704 of the second user device (step 812). At the same time, the volume as received at the first user device 103 is determined and the difference is stored in the memory 704 of the first device 103 as a correction factor such that, as is described in relation to the ‘auto-listening’ feature below, the sound due to one user which can be heard on the other side of the wall can be reproduced (step 814). The process is then repeated on for the second device 103 of the pair (step 816) and set-up is then complete (step 818).

During subsequent use of the pair of devices 103, the LCD panel 606 displays the sound level that can be heard by the neighbor of the user of that device 103. This allows a user to regulate their own sound levels to be below that which their neighbor has stated is the maximum he or she finds acceptable so as not to adversely affect their neighbor’s environment. In this embodiment, the LCD panel 606 is arranged to display a sound wave representing the sound level in the room. The sound wave is displayed in green provided that the stored maximum volume is not exceeded and in red if the volume is exceeded. If the maximum volume is exceeded from more than a predetermined period of time, in this example half an hour, an alarm is triggered and will be heard through the speaker 608.

Each user can also experience the volume levels in the neighbor’s house resulting from his or her own noise by pressing the auto-listener button 611. This results in the microprocessor 702 of the first device 103 retrieving the correction factor from its memory 704 and using this correction factor to process sound received by the microphone 604 such that a representation of what can be heard by the neighbor can be played back through the speaker 608.

In alternative embodiments, the sound could be played back through headphones or the like so that the user can distinguish the sound in their room from the sound they are causing in their neighbor’s rooms.

The microprocessor 702 of each device 103 is also arranged to store historical data in relation to sound levels in its memory 704, using the timer 710 keep track of the time and date and to determine, for example, when and for how long the maximum level of volume was exceeded. This may be used to help resolve neighborhood disputes over sound levels. This information is accessed by pressing the ‘display history’ button 612. The information can be presented at various level of detail, e.g. by year, month, week, day or hour, depending on the requirements of a user.

In another embodiment, instead of an alarm being sounded when acceptable levels are exceeded for too long, the device 103 may be arranged to cut off sound producing devices such as televisions or music players, in order to minimize noise. In addition, in some embodiments, it may be possible to store various acceptable sound levels such that, for example, a higher volume is acceptable during the day than after 2200 hrs, a higher volume may be acceptable at weekends or when a neighbor is away. In some cases, a higher volume could be agreed in advance of a party. Alternatively or additionally, one neighbor may always be allowed to be as loud as the other at any given time. The maximum acceptable volume may be preset, or set according to local regulations or laws, rather than being agreed by the parties. In addition, the devices 103 have been described as monitoring the sound through a wall. They could instead be arranged to monitor the sound through a door, floor or ceiling, or across a corridor or the like.

In other embodiments, a plurality of devices 103 could be assembled within a network and a shared visual display means could be arranged to display data on the noise produced at each. This embodiment could be used to track the noise produced in a community such as a collection of houses or a block of flats. This will encourage an individual to consider their neighbors as he or she will be able to compare his or her noise contribution to that of others. A social contract concerning sound levels could be formally or informally enforced, and a form of noise trading could result.

Of course, features of the embodiments could be combined as appropriate. Also, while the above embodiments have been described in relation to two paired devices, further devices could be included on the local network. In addition, the devices 100, 101, 103 need not be in the same building but could instead be remote from one another and able to communicate over an open network such as a traditional or a mobile telephone network, or via the Internet.

Although the above embodiments have been described in relation to a domestic environment, the disclosure is not limited to such an environment.

In other embodiments, the devices could be arranged between two houses to help create a feeling of proximity. One example would be to have one device in a family house and another in a grandparent’s house. The grandparent would experience the audio environment of the family house as a general background babble and would therefore feel connected with events in the family house and less lonely. Other embodiments may have a web interface such that a user could utilize their computer as one communication device 100, 101, 103, capable of communicating with another computer configured to act as a communication device 100 or with a dedicated communication device 100, 101, 103.

In the above embodiments, two-way communication devices were described. In alternative embodiments now described, the communication devices may be arranged for one-way communication. In one such embodiment, a speaker unit provides a ‘virtual window’ to allow sound from a remote location to be brought into a specific area in the same manner as if it were occurring outside of a window. Such an embodiment is now described with reference to FIG. 9.

Figure 9:
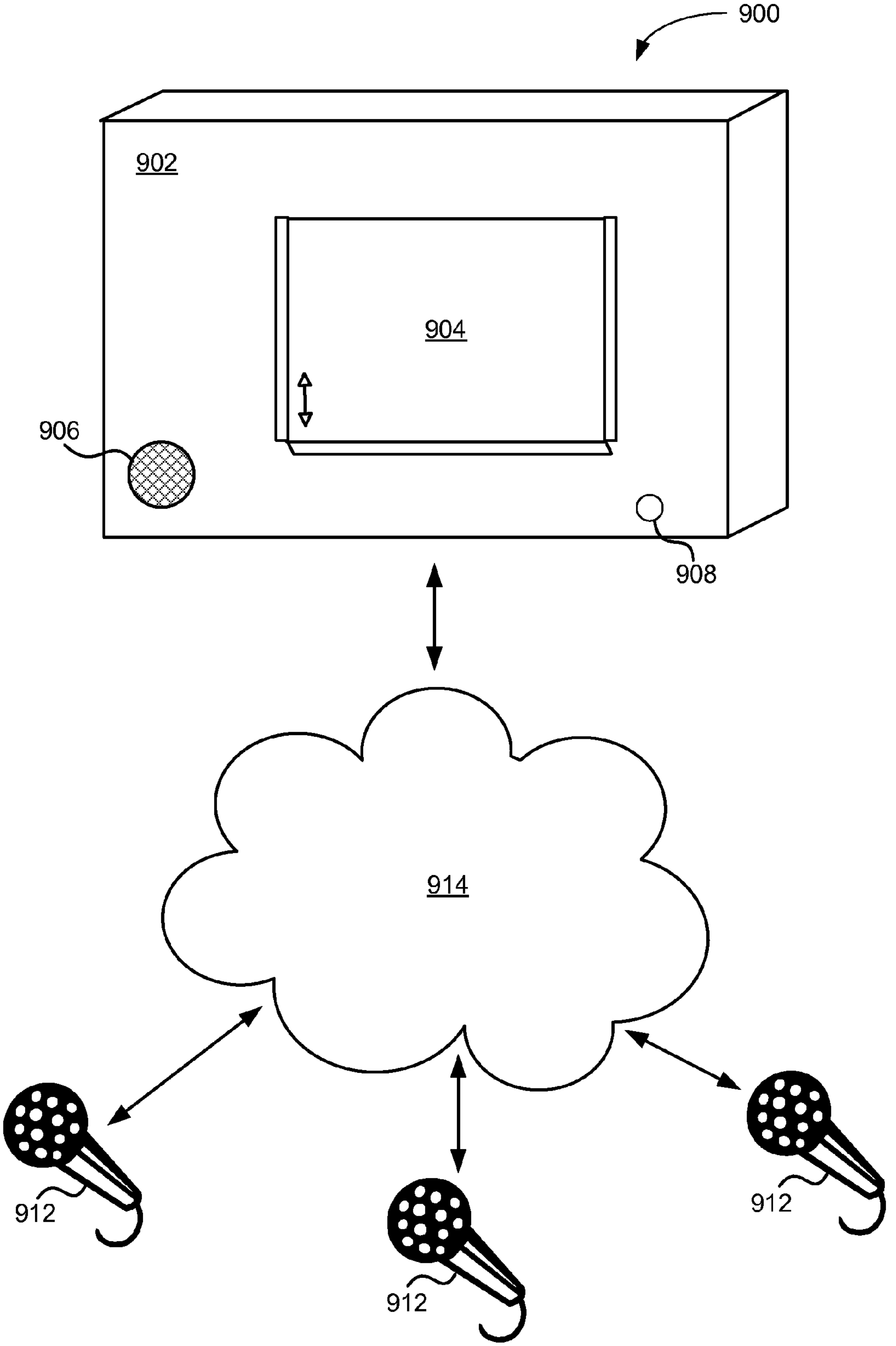
FIG. 9 is a schematic diagram of a network including an example communication device.
Figure 10:
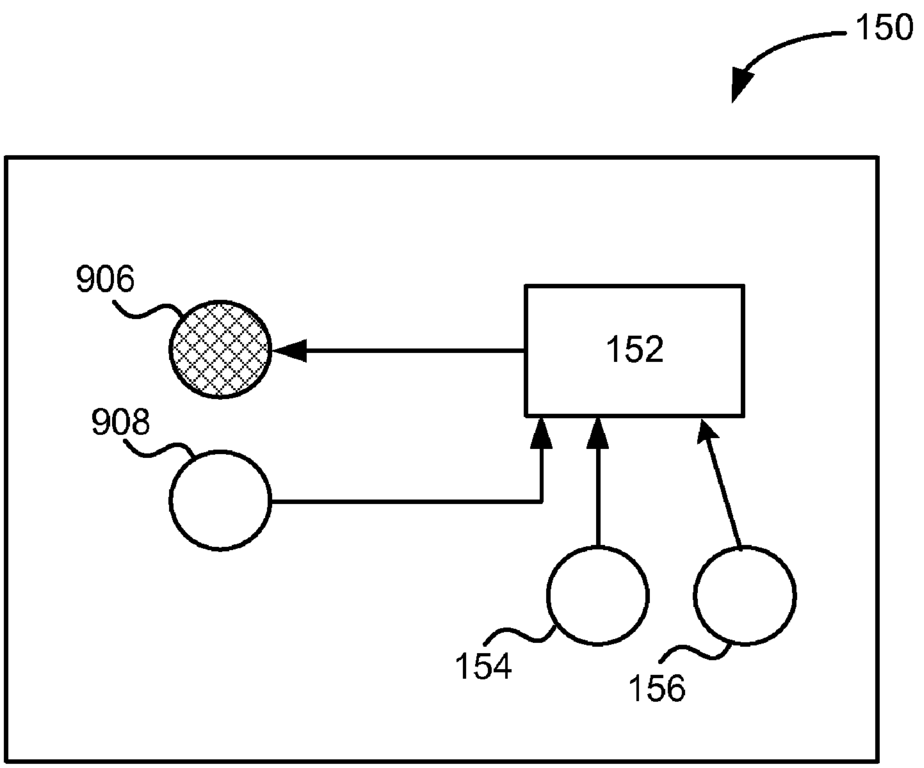
FIG. 10 is a schematic diagram of the processing circuitry of communication device of FIG. 9.

FIG. 9 shows a network 901 comprising a speaker unit in the form of a sound window unit 900 and a plurality of microphones 912. The sound window unit 900 provides a speaker unit and comprises a housing 902 in which is housed a moveable panel 904 which opens and closes vertically in the manner of a sash window. The housing 902 also houses a speaker 906 and a selection dial 908. Inside the housing 902, there is provided processing circuitry 150, as is described in greater detail with reference to FIG. 10. The sound window unit 900 and the movable panel 904 have the form factor of a real window.

The microphones 912 are arranged at various remote locations and are capable of transmitting sound received at their locations to the sound window unit 900 via a wireless network, in this example, the mobile telephone network 914.

The processing circuitry 150 comprises a microprocessor 152, a position sensor 154, arranged to sense the position of the moveable panel 904, and a transmitter/receiver 156. The microprocessor 152 is arranged to receive inputs from the position sensor 154 and the selection dial 908 and to control the output of the speaker 906 based on these inputs.

Figure 11:
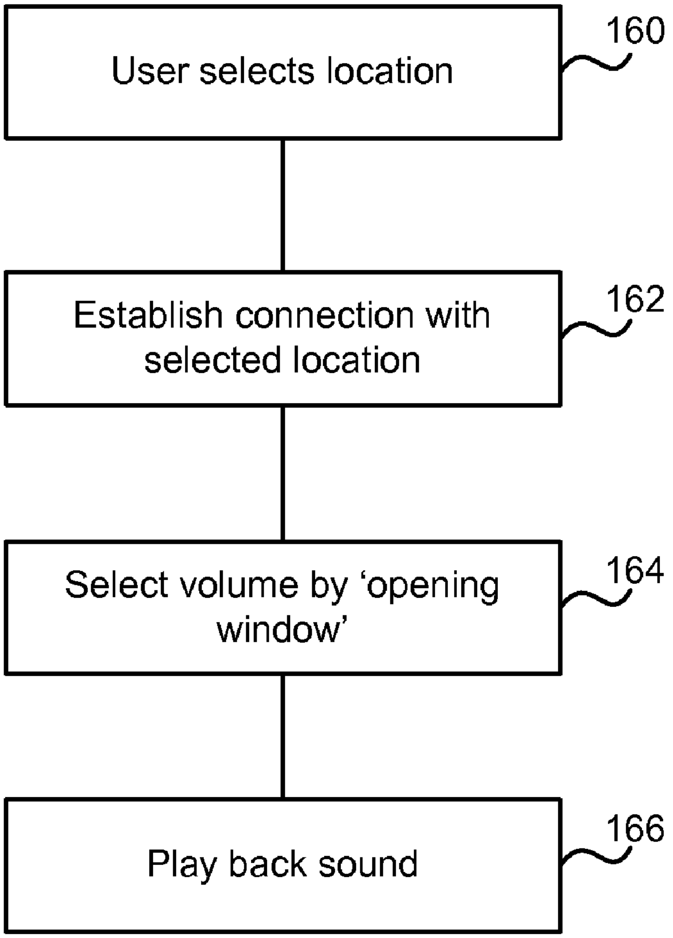
FIG. 11 is a flow diagram of a method for using the apparatus of FIG. 9.

As is described in relation to FIG. 11, in use of the sound window unit 900, a user selects using the selection dial 908 from which microphone 912 sound should be requested (block 160). In this embodiment, the microphones 912 are situated in three locations; specifically one microphone 912 is in the user's garden, the second is in the user's favorite restaurant and the third in on a main road on the user's commuting route. These microphones 912 are arranged to provide an indication of the local weather conditions, the atmosphere in the restaurant and the business of the road respectively. Hearing ambient noise at these locations results in an indication that allows the user to make a choice—of whether to go out if it's rainy or windy (or what to wear), of whether the restaurant is too lively or too quiet, or of whether to take the main road or an alternative route. Alternatively, the ambient noise could simply provide a pleasant background noise, such as the sound of birds singing outside.

The microprocessor 152 detects the position of the selection dial 908 and makes a wireless connection with the microphone 912 at that location using known mobile telephony techniques (block 162). The sound from that selected microphone 912 is then transmitted to the unit 900 and is received by the transmitter/receiver 156.

A user may then select the volume at which sound is played by selecting the position of the moveable panel 904 (block 164). This is detected by the position sensor 154 and the microprocessor 152 determines the volume at which the sound transmitted from the microphone 914 is played through the speaker 906 (block 166). The higher the panel 904 is lifted (i.e. the more open the 'sash window') is, the louder the sound. The effect mimics the behavior of a real window in that amount of sound received through a real window depends on how open the window is.

It will be appreciated that there are a number of variations which could be made to the above described exemplary sound window embodiment without departing from the scope of the invention. For example, the moveable panel 904 may not be mounted as a vertical sash window but may instead be a horizontal sash window, be mounted in the manner of a roller blind, open on a hinge or in some other manner.

The microphones 912 may be moveable or may be arranged in a number of locations which are near the unit 900 (for example in different rooms of the house in which the unit 900 is situated. There could be only one microphone 912, or two or many microphones 912 provided. The network may comprise a wired network, the Internet, a WiFi network or some other network. The network may be arranged to provide a user with a 'virtual presence' in another location.

In one embodiment, the microprocessor 152 may be arranged to modify or provide an abstraction of the sound received by the microphone. As explained above, the term 'abstraction' as used herein should be understood in its sense of generalization by limiting the information content of the audio environment, leaving only the level of information required for a particular circumstance.

The unit 900 could be provided with a visual display means arranged to display data relating to the audio environment at the location of the microphones 912.

Some embodiments may include a sound recognition means and could for example replace the sound with a visual abstraction based on the source of the noise, e.g. a pot to represent cooking sounds. As will be familiar to the person skilled in the art, there are known methods of sound recognition, for example, using probabilistic sound models or recognition of features of an audio signal (which can be used with statistical classifiers to recognize and characterize sound). Such systems may for example be able to tell music from conversation from cooking sound depending on characteristics of the audio signal.

FIGS. 1, 2, 4 to 7, 9 and 10 illustrate various components of exemplary computing-based communication devices 100, 101, 103, 900 which may be implemented as any form of a computing and/or electronic device, and in which embodiments may be implemented.

The computing-based communication device comprises one or more inputs in the form of transmitter receivers which are of any suitable type for receiving media content, Internet Protocol (IP) input, and the like.

Computing-based communications device also comprises one or more processors which may be microprocessors, controllers or any other suitable type of processors for processing computing executable instructions to control the operation of the device. Platform software comprising an operating system or any other suitable platform software may be provided at the computing-based device to enable application software to be executed on the device.

Computer executable instructions may be provided using any computer-readable media, such as memory. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface, or other user interface of any suitable type although this is not essential.

Conclusion

The terms 'computer' and 'processing circuitry' are used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software which runs on or controls "dumb" or standard hardware to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of preferred embodiments given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A communication device comprising:

a flap that receives a selection that sets a degree for which audio data pertaining to an audio environment at a remote location is abstracted;

a processor that receives the audio data pertaining to the audio environment at the remote location in accordance with the degree selected and processes the audio data to create output audio data which conveys a representation of the audio environment in accordance with the degree selected;

one or more speakers that present the representation of the audio environment to a user of the communication device; and a transmitter/receiver unit arranged to allow two-way communication with a second communication device at the remote location.

2. A communication device according to claim 1, wherein the audio data pertaining to the audio environment is based at least in part on measured parameters at the remote location.

3. A communication device according to claim 1, further comprising a privacy selector that allows the user to choose a level of privacy.

4. A communication device according to claim 1, further comprising at least one of the following that abstracts the audio data in accordance with the set degree:

a moveable portion of the communication device;

a motion detector; or a proximity sensor.

5. A communication device according to claim 1, further comprising an indicator to indicate when a local audio environment is being transmitted to the second communication device.

6. A communication device according to claim 1, further comprising a memory that stores a record of an assessed audio environment.

7. A communication device according to claim 6, further comprising a display that displays the stored record.

8. A communication device according to claim 1, further comprising a memory that holds parameters associated with acceptable limits for the audio environment and the processor detects when the audio environment exceeds those limits.

9. A communication device according to claim 1, wherein the audio environment is monitored at the remote location.

10. A communication device according to claim 1, wherein the degree for which the audio data pertaining to the audio environment at the remote location is abstracted is associated with a clarity of the representation of the audio environment presented by the one or more speakers.

11. A communication device according to claim 1, wherein the degree for which the audio data pertaining to the audio environment at the remote location is based, at least in part, on a distance between a physical location of a source of the audio data and the second device at the remote location.

12. A method comprising:

receiving a selection that sets a degree for which audio data pertaining to an audio environment at a remote location is abstracted;

receiving, via a receiving unit coupled to a processor, the audio data pertaining to the audio environment at the remote location;

abstracting the audio data to generate output audio data in accordance with the degree selected; and presenting, via one or more speakers, the output audio data.

13. A method according to claim 12, further comprising receiving a privacy selection that sets a level of privacy.

14. A method according to claim 12, wherein the degree for which the audio data pertaining to the audio environment at the remote location is abstracted is associated with a desired clarity of the audio environment indicated by the selection.

15. A method according to claim 12, wherein the degree for which the audio data pertaining to the audio environment at the remote location is abstracted is based, at least in part, on a distance between a physical location of a source of the audio data and a device that receives the audio data at the remote location.

16. One or more computer memories storing instructions that, when executed by a processor, configure a computer to perform operations comprising:

receiving a selection that sets a degree for which audio data pertaining to an audio environment at a remote location is abstracted;

receiving, via a receiving unit coupled to a processor, the audio data pertaining to the audio environment at the remote location;

muffling the audio data to generate output audio data in accordance with the degree for which the audio data pertaining to the audio environment at the remote location is abstracted; and presenting, via one or more speakers, the output audio data.

17. One or more computer memories according to claim 16, wherein the degree for which the audio data pertaining to the audio environment at the remote location is abstracted is associated with a desired clarity of the audio environment indicated by the selection.

18. One or more computer memories according to claim 16, wherein the degree for which the audio data pertaining to the audio environment at the remote location is abstracted is based, at least in part, on a distance between a physical location of a source of the audio data and a device that receives the audio data at the remote location.

* * * * *